US012790846B2

(12) United States Patent
Cieslak et al.

(10) Patent No.: US 12,790,846 B2
(45) Date of Patent: Nov. 10, 2026

(54) FILTER CARTRIDGE FOR SWIMMING POOLS AND SPAS

(71) Applicant: FLUIDRA GROUP AUSTRALIA PTY LTD., Smithfield (AU)

(72) Inventors: Ryszard Stanislaw Cieslak, Frankston (AU); Timothy James Vohmann, Elsternwick (AU); Brendan John Butler, Drouin (AU)

(73) Assignee: FLUIDRA GROUP AUSTRALIA PTY LTD., Smithfield (AU)

( * ) Notice: Subject to any disclaimer, the term of this patent is extended or adjusted under 35 U.S.C. 154(b) by 531 days.

(21) Appl. No.: 18/211,088

(22) Filed: Jun. 16, 2023

(65) Prior Publication Data

US 2023/0407658 A1 Dec. 21, 2023

Related U.S. Application Data

(60) Provisional application No. 63/353,808, filed on Jun. 20, 2022.

(51) Int. Cl.
*E04H 4/12* (2006.01)
*B01D 29/15* (2006.01)
*B01D 35/30* (2006.01)

(52) U.S. Cl.
CPC ........... *E04H 4/1209* (2013.01); *B01D 29/15* (2013.01); *B01D 35/30* (2013.01); *B01D 2201/0415* (2013.01)

(58) Field of Classification Search
None
See application file for complete search history.

(56) References Cited

U.S. PATENT DOCUMENTS 955,787 A * 4/1910 Freeman ................ B01D 21/26 210/304
2,057,257 A * 10/1936 Walker ............... B01D 19/0057 95/260
2,332,188 A * 10/1943 Andrews ................ B01D 29/21 210/304

(Continued)

FOREIGN PATENT DOCUMENTS

CN 109420379 A 3/2019
ES 1138660 U 4/2015

(Continued)

OTHER PUBLICATIONS

International Application No. PCT/IB2023/056267, International Search Report and Written Opinion mailed on Aug. 23, 2023, 9 pages.

(Continued)

*Primary Examiner* — Robert J Popovics
(74) *Attorney, Agent, or Firm* — Kilpatrick Townsend & Stockton LLP

(57) ABSTRACT

A filter cartridge for a pool or spa includes a fluid flow path into the filter cartridge, and the orientation of the fluid flow path is adjustable. A diverter may be provided within a housing of the filter cartridge for adjusting the orientation of the fluid flow path of the pool water entering the housing. The diverter may be detachable and allow multiple angular settings directing flow. Additionally, or alternatively, the filter cartridge includes internal vertical ribs for directing debris caught by the filter cartridge.

10 Claims, 5 Drawing Sheets

(56) References Cited

U.S. PATENT DOCUMENTS

| | | | | | |
|---|---|---|---|---|---|
| 2,521,107 | A * | 9/1950 | Wiley | B01D 29/114 55/318 |
| 2,983,384 | A * | 5/1961 | Winslow | B01D 21/267 210/313 |
| 2,994,403 | A * | 8/1961 | Winslow | B01D 35/22 96/400 |
| 3,067,876 | A * | 12/1962 | Hruby, Jr. | B01D 29/115 210/512.1 |
| 3,088,595 | A * | 5/1963 | Robb | F25J 3/08 210/188 |
| 3,127,255 | A * | 3/1964 | Winslow | B01D 21/10 55/421 |
| 3,202,284 | A * | 8/1965 | Wade | B01D 33/25 210/345 |
| 3,637,078 | A * | 1/1972 | Hollar | B01D 27/08 210/456 |
| 3,774,772 | A * | 11/1973 | Yeths | B01D 29/668 210/167.13 |
| 3,828,930 | A | 8/1974 | Eimer et al. | |
| 4,235,610 | A | 11/1980 | Richard | |
| 4,529,518 | A | 7/1985 | Jackson | |
| 4,597,871 | A | 7/1986 | Okouchi et al. | |
| 4,704,202 | A * | 11/1987 | Poyner | B01D 29/54 210/138 |
| 4,978,450 | A | 12/1990 | Drori | |
| 5,053,126 | A * | 10/1991 | Krasnoff | B04C 5/02 55/327 |
| 5,196,119 | A * | 3/1993 | Harms | B01D 29/111 210/453 |
| 5,545,321 | A | 8/1996 | Drori | |
| 6,117,340 | A * | 9/2000 | Carstens | B01D 21/0012 210/512.1 |
| 6,666,968 | B2 * | 12/2003 | Smith | B01D 29/15 210/DIG. 17 |
| 7,335,298 | B2 | 2/2008 | Axelrod | |
| 10,005,011 | B2 * | 6/2018 | Marciano | B01D 29/92 |
| 11,331,616 | B2 * | 5/2022 | Henderson | C02F 1/004 |
| 11,628,948 | B2 * | 4/2023 | Brown | B01D 29/15 210/787 |
| 11,883,771 | B2 * | 1/2024 | Henderson | B01D 24/14 |
| 12,128,344 | B2 * | 10/2024 | Henderson | B01D 24/14 |
| 2004/0200770 | A1 | 10/2004 | Clary | |
| 2008/0185326 | A1 * | 8/2008 | Serafin | B01D 29/115 210/186 |
| 2011/0062068 | A1 * | 3/2011 | Nibler | C02F 1/001 210/167.12 |
| 2015/0114915 | A1 | 4/2015 | Marciano et al. | |
| 2019/0388807 | A1 * | 12/2019 | van der Meijden | C02F 1/001 |
| 2023/0407658 | A1 * | 12/2023 | Cieslak | E04H 4/1209 |
| 2024/0399275 | A1 * | 12/2024 | Okuno | B01D 35/02 |

FOREIGN PATENT DOCUMENTS

| | | | |
|---|---|---|---|
| GB | 2055301 | A | 3/1981 |
| WO | 2005107919 | A2 | 11/2005 |
| WO | 2016162097 | A1 | 10/2016 |

OTHER PUBLICATIONS

International Application No. PCT/IB2023/056267, International Preliminary Report on Patentability mailed on Jan. 2, 2025, 6 pages.
European Application No. 23826631.6, Extended European Search Report mailed on Apr. 8, 2026, 10 pages.

* cited by examiner

FILTER CARTRIDGE FOR SWIMMING POOLS AND SPAS

REFERENCE TO RELATED APPLICATION

This application claims the benefit of U.S. Provisional Patent Application No. 63/353,808, filed on Jun. 20, 2022, and entitled FILTER CARTRIDGE FOR SWIMMING POOLS AND SPAS, the content of which is hereby incorporated by reference in its entirety.

FIELD OF THE INVENTION

This invention relates to filter cartridges, and more particularly, although not necessarily exclusively, to filter cartridges for use in connection with a swimming pool or spa.

BACKGROUND OF THE INVENTION

Filter units may be used to remove contaminants from a fluid such as pool water of a swimming pool or spa. Common filter units for swimming pools or spas may be sand filters or filter cartridges. Sand filters typically include a housing (e.g., filter tank) filled with sand, and pool water is filtered by passing into an entry port of the housing, through the sand, and then out an exit port of the filter. Filter cartridges filters include a housing with a cartridge having a filtering member. The cartridge is provided inside of the housing, and pool water is filtered by passing into an entry of the housing, through the cartridge and cartridge membrane, and out an exit port of the housing. To produce a cyclonic flow within the housing, the entry ports of filter cartridges have been provided as tangential entry ports that are fixed (and often integral) with the housing as illustrated, for example, in U.S. Pat. No. 10,005,011 to Marciano et al., thereby providing a single flow pattern and angular direction within the housing.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a filter cartridge includes an internal diverter changing a direction of fluid flow into the filter cartridge.

According to some embodiments, a filter cartridge for a pool or spa includes a fluid flow path into the housing, and the fluid flow path has an adjustable orientation.

According to various embodiments, a filter cartridge for a pool or spa includes a housing and an adjustable diverter within the housing for controlling a fluid flow into the housing.

According to certain embodiments, a diverter for a filter cartridge may adjust an orientation of a fluid flow path into the filter cartridge for a pool or spa.

According to various embodiments, a diverter in a filter cartridge may allow for multiple angular settings directing flow.

According to some embodiments, a filter cartridge includes a housing with internal vertical ribs for directing debris caught by the filter cartridge.

According to certain embodiments, a method of filtering pool water includes controlling an orientation of a fluid flow path of pool water into a housing of a filter cartridge using an internal diverter.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DESCRIPTION OF THE INVENTION

Described herein filter cartridges with improved flow control and associated methods. In some embodiments, an angle and/or direction of a flow of fluid into a housing of the filter cartridge is adjustable. According to certain embodiments, a diverter device may be within the housing, and the diverter device may be rotatable relative to the housing, thereby allowing for multiple angular settings directing flow. In some embodiments, the diverter device may be a detachable device within the housing, and the diverter device may use various devices or mechanisms to detachably engage the filter cartridge while being positioned to control the flow of fluid entering the entry port of the filter cartridge and into the housing. The diverter device may be controlled to produce various flow patterns as desired. In one non-limiting example, the diverter device may be controlled to create a predominantly radial flow inside the housing. Additionally, or alternatively, filter cartridges described herein may include internal ribs within the housing. The internal ribs may be provided on an inner surface of the housing. In such embodiments, the internal ribs may promote the direction of debris caught in the filter cartridge. A filter cartridge with both the diverter and the internal ribs may promote debris to be caught and directed downwards within the filter cartridge.

Filter cartridges described herein with the adjustable entry flow therefore may allow for improved customization and ability to provide a desired fluid flow through the filter cartridge. Filter cartridges described herein further allow for improved customization and design of the housing of the filter cartridge as the entry port need not be a tangential entry port to generate cyclonic flow within the housing. As an example, filter cartridges according to embodiments of the invention may be more compact by not requiring the entry port to be tangential. Various other benefits and advantages may be realized with the devices and methods provided herein, and the aforementioned advantages should not be considered limiting.

Figure 1:
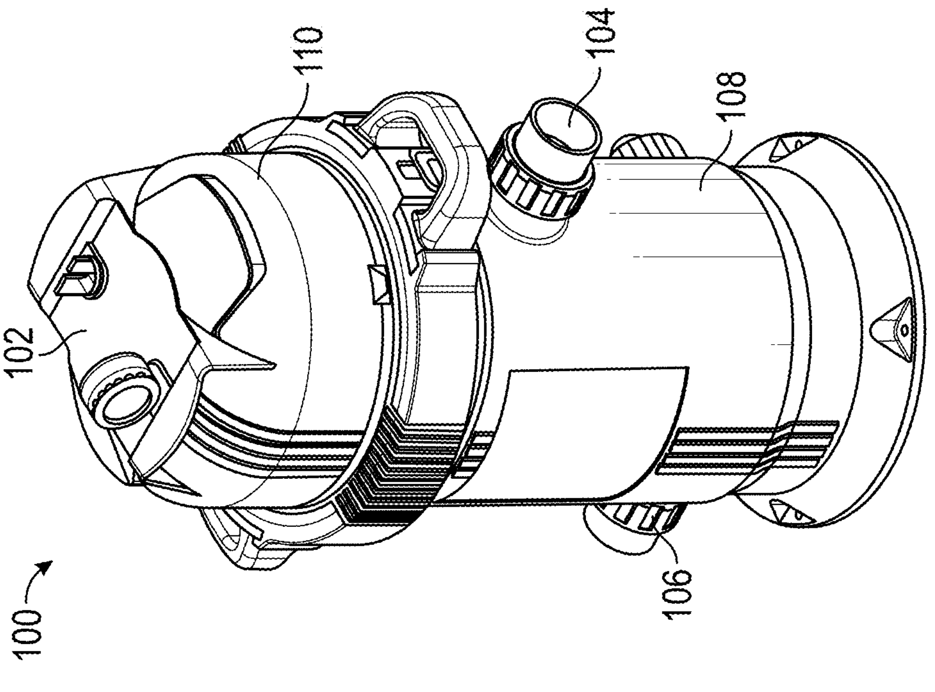
FIG. 1 illustrates a filter cartridge for a swimming pool or spa according to embodiments.

FIGS. 1-8 illustrate a filter cartridge 100 according to various embodiments. The filter cartridge 100 generally includes a housing 102 having at least one entry port 104 and an exit port 106. In some embodiments, and as illustrated in FIG. 1, the housing 102 optionally may have more than one entry port 104, although it need not in other examples. A cartridge 116 having a filtering membrane or material 118 is provided within the housing 102 such that pool water is filtered by flowing into the housing 102 via the entry port 104, through the cartridge 116, and out the housing 102 via the exit port 106.

Figure 2:
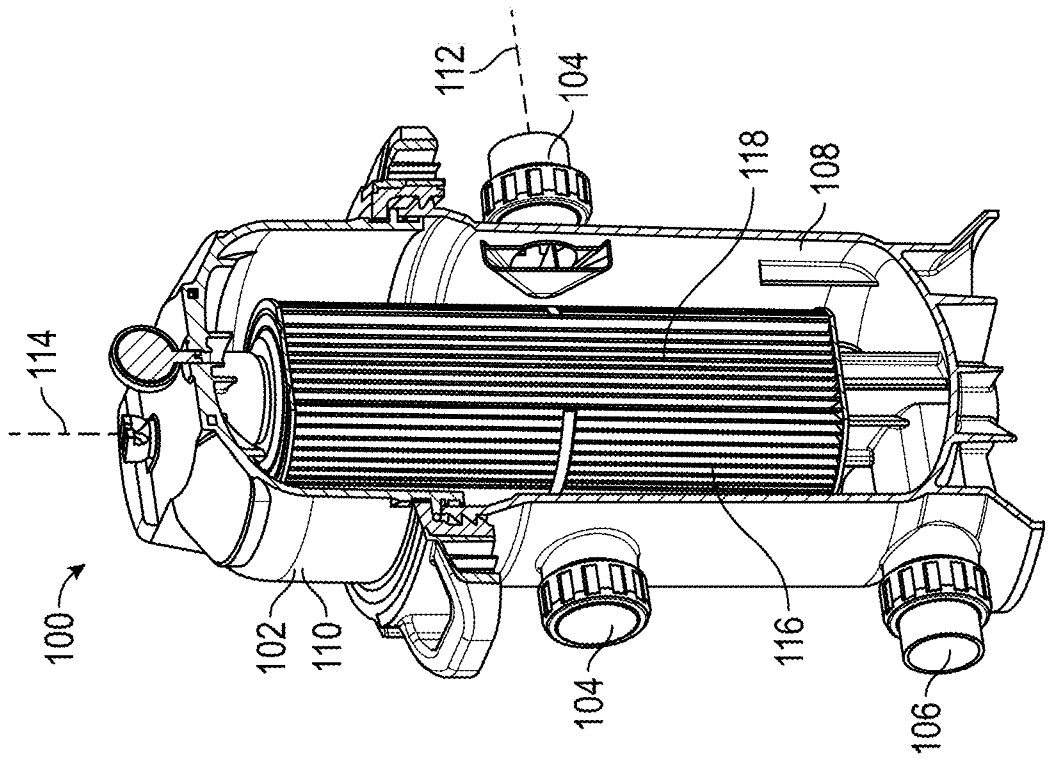
FIG. 2 is another view of the filter cartridge of FIG. 1.

Optionally, and as illustrated in FIGS. 1 and 2, the housing 102 is a two-component construction having a base 108 and a cover 110; however, in other embodiments, the housing 102 may have other constructions as desired and with any number of components as desired.

In some embodiments, and as best illustrated in FIG. 2, the entry port 104 may be a radial entry port, meaning that a central axis 112 of the entry port 104 intersects a central axis 114 of the housing 102. In other embodiments, the entry port 104 may be a tangential entry port (e.g., where the central axis 112 does not intersect the central axis 114). In yet other embodiments, the entry port 104 may be provided at various locations and in configurations as desired. As discussed in detail below, in various embodiments a flow of fluid such as pool water through the entry port 104 and into the housing 102 is adjustable regardless of the particular location of the entry port 104.

Figure 4:
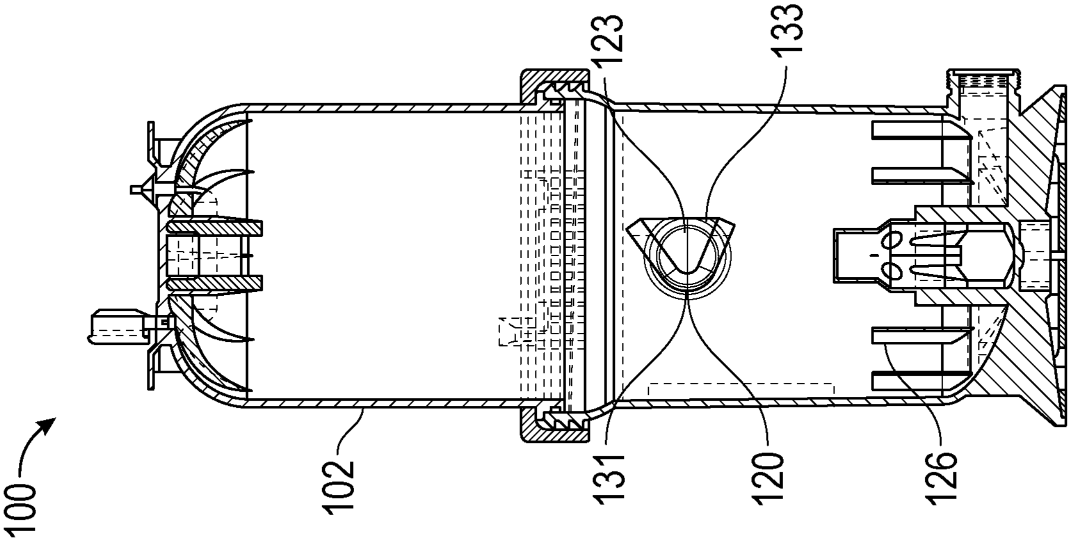
FIG. 4 illustrations another portion of the filter cartridge of FIG. 1.
Figure 3:
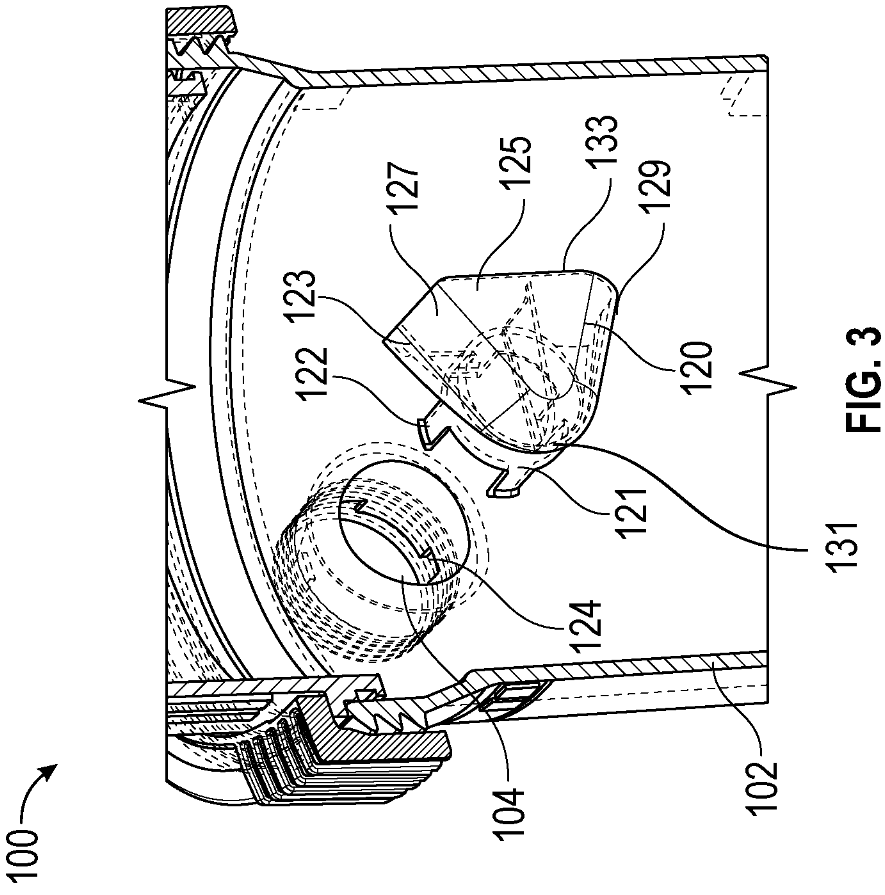
FIG. 3 illustrates a portion of the filter cartridge of FIG. 1.
Figure 6:
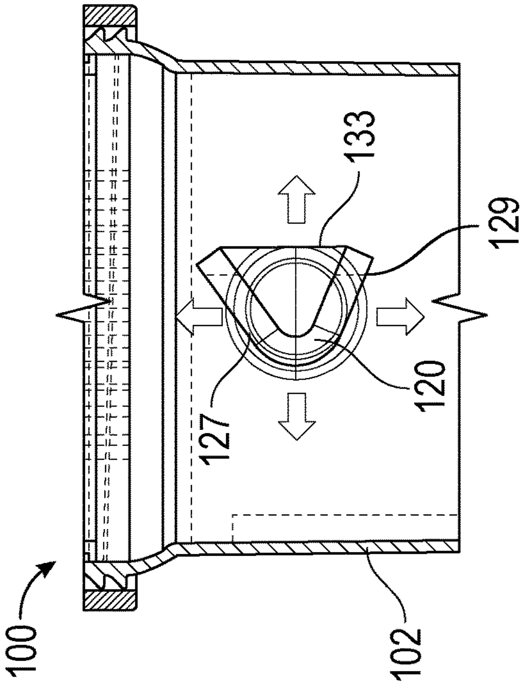
FIG. 6 illustrates another portion of the filter cartridge of FIG. 1.
Figure 5:
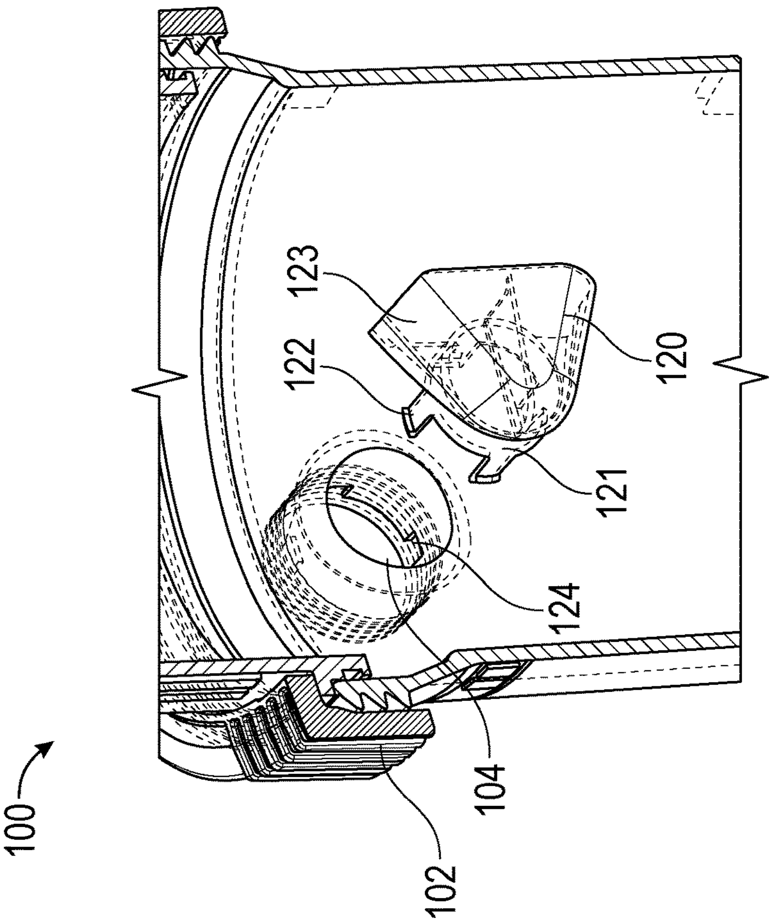
FIG. 5 illustrates another portion of the filter cartridge of FIG. 1.

Referring to FIGS. 2-7, in various embodiments, the filter cartridge 100 includes at least one diverter 120 within the housing 102 for controlling the flow of pool water entering the housing 102. In the embodiment illustrated, the filter cartridge 100 includes two diverters 120—one for each entry port 104—although in other embodiments, any number of diverters 120 may be utilized. In various embodiments, the diverter 120 may receive the fluid flow from the entry port 104 and change a direction of the flow path to be different from the flow path within the entry port 104. As illustrated in FIG. 3, the diverter 120 includes a base portion 121 and a head portion 123. The base portion 121 is insertable into the entry port 104 and receives water from the entry port 104 in a first direction. The head portion 123 includes an end wall 125 provided opposite the base portion 121, an upper side wall 127 between the base portion 121 and the end wall 125, a lower side wall 129 between the base portion 121 and the end wall 125, a first side 131, and a second side 133. The end wall 125, upper side wall 127, and lower side wall 129 collectively define an opening 135 at the second side 133, and water entering the head portion 123 from the base portion 121 is redirected in a second direction out the opening 135. As illustrated in FIGS. 5 and 6, for example, the upper side wall 127 is angled upwards relative to the first side 131 and the second side wall 129 is angled downwards relative to the first side 131 such that the head portion 123 is asymmetrical between the first and second sides 131, 133.

The diverter 120 may be a detachable device that may be coupled with the filter cartridge 100 using various techniques or mechanisms as desired. In some embodiments, and as best illustrated in FIG. 3, the diverter 120 may include tabs 122 that create a snap-fit engagement with the entry port 104. In such embodiments, at least a portion of the diverter 120 is positioned within the entry port 104. In other embodiments, other techniques or mechanisms may be utilized as desired, including but not limited to friction fit connections, clips, clasps, hooks, pins, bolts, combinations thereof, and/or other mechanisms or techniques as desired. Moreover, in other embodiments, the diverter 120 may be supported at various locations proximate to the entry port 104, and the diverter 120 need not necessarily be positioned within the entry port 104.

As represented by the arrows in FIG. 6, the diverter 120 may be rotated to be at various angular orientations relative to the housing 102, thereby providing various flow patterns within the housing 102 depending on the particular orientation of the diverter 120. In various embodiments, the diverter 120 may be rotated before being coupled to the housing 102 and/or after being coupled to the housing 102. In some embodiments, the housing 102 (and/or the entry port 104) may include one or more predefined angular positions that the diverter 120 may be positioned. As a non-limiting example and as best illustrated in FIG. 3, the entry port 104 may include a plurality of notches 124, and the diverter 120 may be rotated such that the tabs 122 engage different notches 124 depending on the desired angular orientation. In other embodiments, other features or mechanisms may be utilized to predefine angular positions for the diverter 120. In certain embodiments, and as illustrated in FIGS. 3-7, the diverter 120 is attached to the entry port 104 such that the opening 135 faces horizontally.

In yet other embodiments, the filter cartridge 100 need not include predefined positions for the diverter 120. In such embodiments, the diverter 120 and/or the housing 102 may include a stopper for maintaining an orientation of the diverter 120 relative to the housing 102 when the diverter 120 is at the desired angular orientation. Stoppers may be various devices or mechanisms including but not limited to clamping devices, friction devices, ribs, and/or other devices or mechanisms as desired.

The diverter 120 may be controlled to be at various angular orientations as desired, thereby providing various flow patterns and/or flow paths in different directions as desired. As a non-limiting example and as represented by the arrows in FIG. 7, the diverter 120 may be rotated to be at an angular orientation for creating a radial flow of pool water inside the filter cartridge 100. Other flow patterns may be generated as desired.

Figure 7:
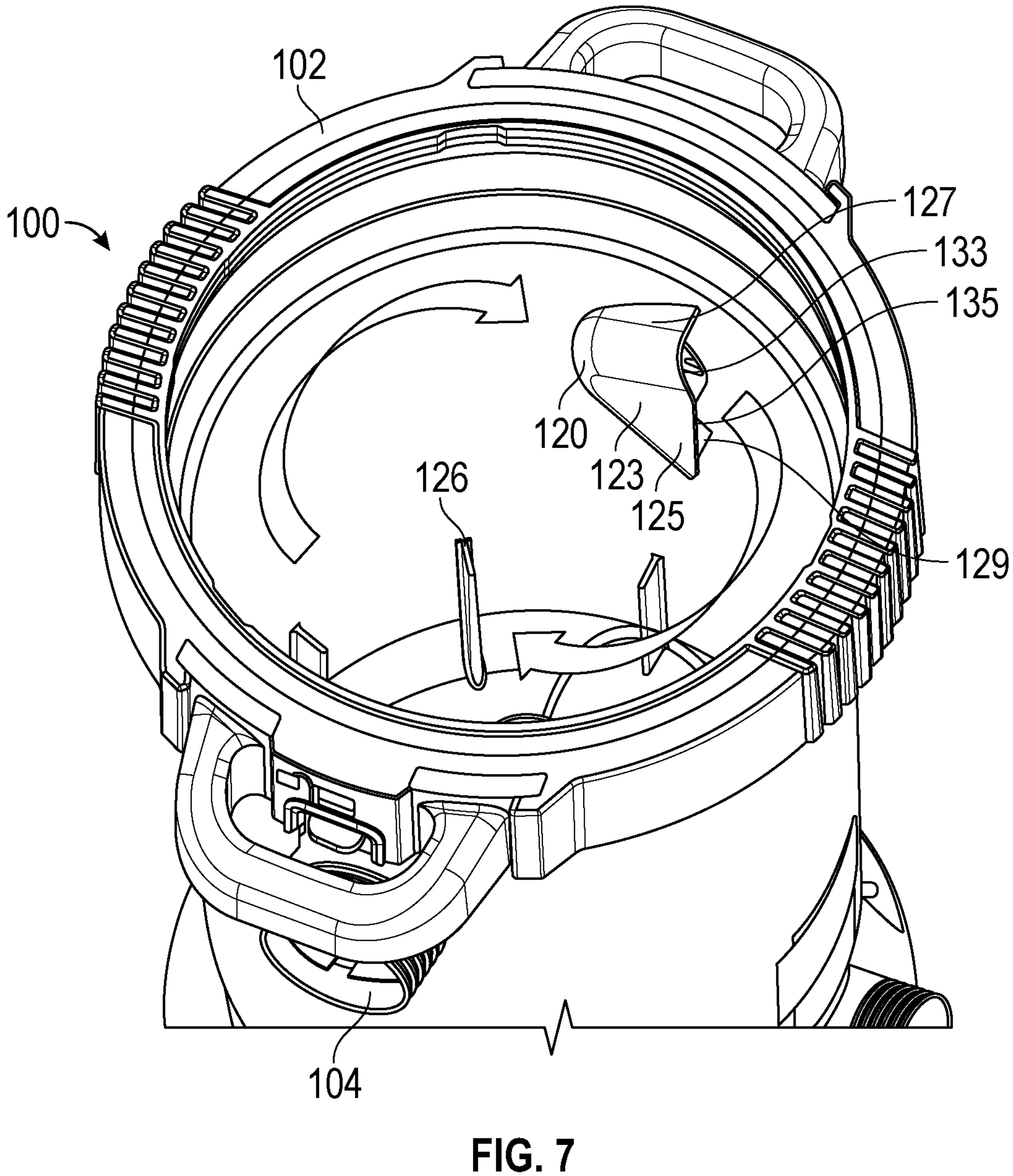
FIG. 7 illustrates another portion of the filter cartridge of FIG. 1.
Figure 8:
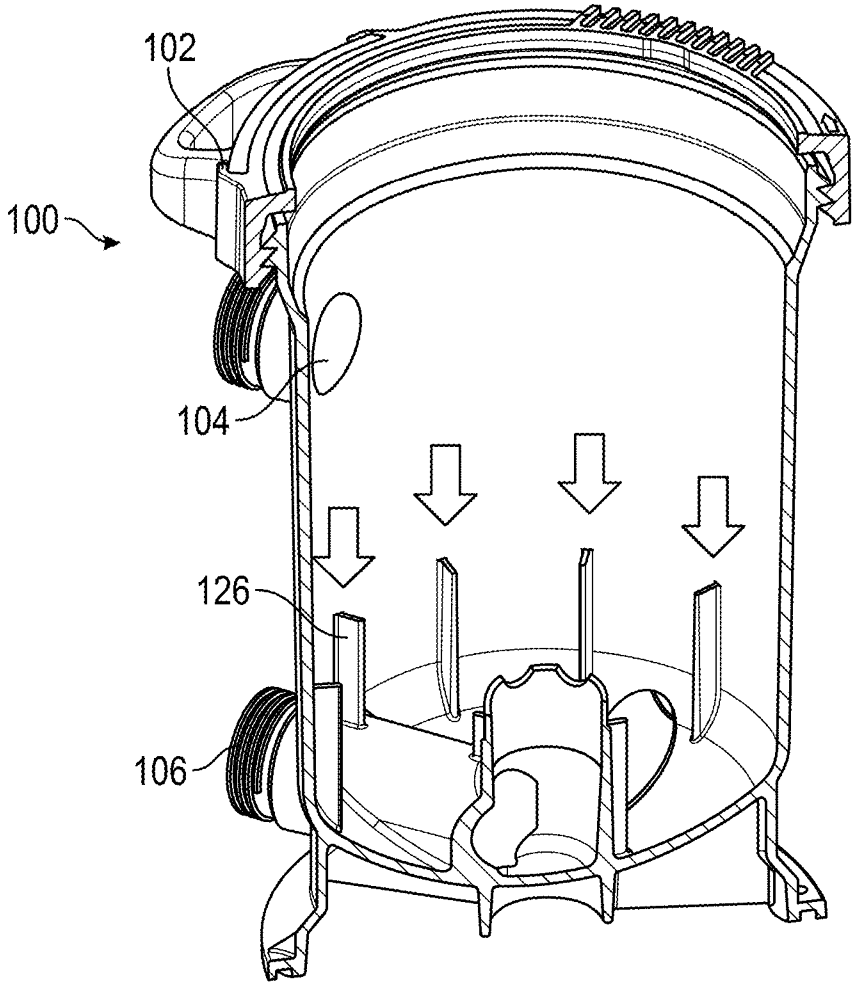
FIG. 8 illustrates another portion of the filter cartridge of FIG. 1.

Additionally, or alternatively to the diverter(s) 120, the filter cartridge 100 may include internal ribs 126 on the housing 102 as illustrated in FIGS. 4, 7, and 8. Any number of internal ribs 126 may be provided as desired, and in various embodiments the internal ribs 126 are provided at a location below the entry port 104. The internal ribs 126 may promote the collection and direction of debris downward within the housing 102 (represented by the arrows in FIG. 8). In certain embodiments, the centrifugal forces created by the diverter 120 together with the internal ribs 126 may promote the capture of debris and the direction of such captured debris towards a lower end of the housing 102 and between the internal ribs 126.

Exemplary concepts or combinations of features of the invention may include:

A. A filter cartridge with an internal diverter changing a direction of fluid flow into the filter cartridge.

B. The filter cartridge according to any preceding or subsequent statement or combination of statements, wherein the internal diverter is detachable from a housing of the filter cartridge.

C. The filter cartridge according to any preceding or subsequent statement or combination of statements, wherein the internal diverter is adjustable to provide multiple angular settings directing flow.

D. The filter cartridge according to any preceding or subsequent statement or combination of statements, wherein a central axis of the entry port intersects a central axis of the housing.

E. The filter cartridge according to any preceding or subsequent statement or combination of statements, further comprising internal ribs within the housing and at a location below the entry port, wherein the internal ribs direct debris downward within the housing.

F. The filter cartridge according to any preceding or subsequent statement or combination of statements, wherein the internal diverter is configured to create a predominantly radial flow inside the housing.

G. The filter cartridge according to any preceding or subsequent statement or combination of statements, further comprising a filtering material within the housing, and wherein the housing further comprises an exit port.

H. A filter cartridge for a pool or spa having a fluid flow path into the housing, the fluid flow path having an adjustable orientation.

I. The filter cartridge according to any preceding or subsequent statement or combination of statements, further comprising a diverter within the housing for controlling the orientation of the fluid flow path into the housing.

J. The filter cartridge according to any preceding or subsequent statement or combination of statements, wherein the fluid flow path is adjustable to one or more predefined angular orientations.

K. A filter cartridge for a pool or spa having a housing and an adjustable diverter within the housing for controlling a fluid flow into the housing.

L. The filter cartridge according to any preceding or subsequent statement or combination of statements, wherein the adjustable diverter is rotatable relative to the housing.

M. The filter cartridge according to any preceding or subsequent statement or combination of statements, wherein the adjustable diverter is detachable from the housing.

N. A diverter for adjusting an orientation of a fluid flow path into a filter cartridge for a pool or spa.

O. A diverter in a filter cartridge allowing multiple angular settings directing flow.

P. A filter cartridge comprising a housing with internal vertical ribs for directing debris caught by the filter cartridge.

Q. The filter cartridge according to any preceding or subsequent statement or combination of statements, further comprising a diverter allowing multiple angular settings directing flow.

R. A method of filtering pool water, the method comprising controlling an orientation of a fluid flow path of pool water into a housing of a filter cartridge using an internal diverter.

S. The method according to any preceding or subsequent statement or combination of statements, further comprising creating a radial flow within the filter cartridge.

T. The method according to any preceding or subsequent statement or combination of statements, further comprising directing debris caught by the filter cartridge downwards using internal vertical ribs.

U. The method according to any preceding or subsequent statement or combination of statements, wherein controlling the orientation of the fluid flow path comprises changing the fluid flow path from along a central axis of an entry port intersecting a central axis of the housing.

V. The method according to any preceding or subsequent statement or combination of statements, wherein controlling the orientation of the fluid flow path comprises rotating the internal diverter within the housing.

W. The method according to any preceding or subsequent statement or combination of statements, wherein controlling the orientation of the fluid flow path comprises detaching the internal diverter from an entry port of the housing, rotating the internal diverter, and re-attaching the internal diverter to the entry port.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention. Further, although applicant has described devices and techniques for use principally with pools and spas, persons skilled in the relevant field will recognize that the present invention conceivably could be employed in connection with other objects and in other manners. Finally, references to “pools” and “swimming pools” herein may also refer to spas or other water containing vessels used for recreation or therapy and for which cleaning of debris is needed or desired.

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as “up,” “down,” “top,” “bottom,” “left,” “right,” “front,” and “back,” among others, are intended to refer to the orientation as illustrated and described in the figure (or figures) to which the components and directions are referencing. In the figures and the description, like numerals are intended to represent like elements. As used herein, the meaning of “a,” “an,” and “the” includes singular and plural references unless the context clearly dictates otherwise.

The above-described aspects are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. A filtration assembly for a swimming pool or spa comprising:

a housing (102) with a filtrate outlet (106) and a cylindrical sidewall including an entry port (104);

a flow diverter (120) within the housing (102) including:

a base portion (121) extending into the entry port (104); and a head portion (123) including:

an end wall (125) opposite the base portion (121);

an upper side wall (127) between the base portion (121) and the end wall (125);

a lower side wall (129) between the base portion (121) and the end wall;

a first side (131); and a second side (133);

wherein the entry port (104) comprises a plurality of notches (124) and wherein the base portion (121) of the flow diverter (120) comprises a plurality of tabs (122) configured to engage the plurality of notches (124);

wherein the end wall (125), the upper side wall (127), and lower side wall (129) collectively define an opening (135) at the second side (133);

wherein the flow diverter (120) is configured to redirect entering fluid flow from a first direction passing through the entry port (104) to a second direction exiting the opening (135);

wherein the flow diverter (120) is attached to the entry port (104) such that the opening (135) faces horizontally relative to a central axis of the housing (102);

wherein the upper side wall (127) is angled upwards relative to the first side (131) and wherein the lower side wall (129) is angled downwards relative to the first side (131) such that the head portion (123) is asymmetrical between the first side (131) and the second side (133); and a filter cartridge (116) disposed within the housing (102) fluidically interposed between the entry port (104) and the filtrate outlet (106), such that fluid entering the entry port (104) passes through the filter cartridge (116) and produces a filtrate as it flows through the filter cartridge (116) to the filtrate outlet (106).

2. The filtration assembly of claim 1, wherein the flow diverter (120) is detachable from the cylindrical sidewall.

3. The filtration assembly of claim 1, wherein the flow diverter (120) is rotatable relative to the entry port (104).

4. The filtration assembly of claim 1, comprising a plurality of flow diverters (120) mounted on the cylindrical sidewall.

5. The filtration assembly of claim 1, comprising two flow diverters (120) mounted on the cylindrical sidewall.

6. The filtration assembly of claim 5, wherein the two flow diverters (120) are mounted on opposite sides of the housing (102).

7. The filtration assembly of claim 1, wherein a central axis of the entry port (104) intersects the central axis of the housing (102).

8. The filtration assembly of claim 1, further comprising internal ribs (126) within the housing (102) positioned below the entry port (104), wherein the internal ribs (126) direct debris downward within the housing (102).

9. The filtration assembly of claim 1, wherein the filter cartridge (116) comprises a pleated filtration media (118).

10. The filtration assembly of claim 1, wherein the housing (102) comprises a base (108) and a cover (110).

* * * * *